(12) United States Patent
Tokura et al.

(10) Patent No.: US 11,742,124 B2
(45) Date of Patent: Aug. 29, 2023

(54) CONTROLLER AND CONTROL METHOD FOR LINEAR SOLENOID VALVE

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Takeshi Yasuda, Kuwana (JP); Tomohiro Kondo, Nisshin (JP); Tomoyuki Koike, Nisshin (JP); Masanori Matsubara, Toyota (JP); Yasuhiro Tanaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/457,821

(22) Filed: Dec. 6, 2021

(65) Prior Publication Data

US 2022/0181055 A1 Jun. 9, 2022

(30) Foreign Application Priority Data

Dec. 8, 2020 (JP) .................................. 2020-203226

(51) Int. Cl.
| | |
|---|---|
| *F16K 31/06* | (2006.01) |
| *H01F 7/06* | (2006.01) |
| *H01F 7/08* | (2006.01) |
| *H01F 7/16* | (2006.01) |

(52) U.S. Cl.
CPC .......... *H01F 7/064* (2013.01); *F16K 31/0675* (2013.01); *H01F 7/081* (2013.01); *H01F 7/16* (2013.01)

(58) Field of Classification Search
CPC ...... F16K 31/0675; H01F 7/064; H01F 7/081; H01F 7/16; F15B 21/045
See application file for complete search history.

(56) References Cited

U.S. PATENT DOCUMENTS

| | | | | |
|---|---|---|---|---|
| 10,079,087 | B2* | 9/2018 | Matsumoto | ......... F02D 41/1408 |
| 10,337,634 | B2* | 7/2019 | Mizuno | .................... H01F 7/064 |
| 10,712,755 | B2* | 7/2020 | Ishii | .................... G05D 16/2022 |
| 11,168,785 | B1* | 11/2021 | Bae | ..................... F16H 61/0265 |
| 11,309,112 | B2* | 4/2022 | Katagiri | .............. F16K 31/0675 |

(Continued)

FOREIGN PATENT DOCUMENTS

| | | |
|---|---|---|
| JP | 2014197655 A | 10/2014 |
| JP | 2020009275 A | 1/2020 |

(Continued)

*Primary Examiner* — Matthew W Jellett
(74) *Attorney, Agent, or Firm* — Hunton Andrews Kurth LLP (57) ABSTRACT

A controller executes a dither control that cyclically increases and decreases an exciting current in a linear solenoid valve so as to vibrate a spool of the linear solenoid valve. A vibration cycle of the spool obtained through the dither control is referred to a dither cycle. The dither control includes a first dither control that vibrates the spool in a first dither cycle and a second dither control that vibrates the spool in a second dither cycle that is shorter than the first dither cycle. The controller executes the first dither control and the second dither control when an oil temperature of the hydraulic oil is between a first oil temperature and a second oil temperature that is higher than the first oil temperature.

7 Claims, 8 Drawing Sheets

(56) References Cited

U.S. PATENT DOCUMENTS

| | | | |
|---|---|---|---|
| 11,549,583 B2 * | 1/2023 | Nakagawa | H02H 3/08 |
| 2014/0254058 A1 | 9/2014 | Suzuki et al. | |
| 2017/0062110 A1 * | 3/2017 | Matsumoto | H01F 7/064 |
| 2020/0019196 A1 * | 1/2020 | Tokura | F16K 31/0675 |
| 2021/0304937 A1 | 9/2021 | Tokura et al. | |

FOREIGN PATENT DOCUMENTS

| | | | | |
|---|---|---|---|---|
| JP | 2021163860 A | | 10/2021 | |
| WO | WO-2019059152 A1 * | 3/2019 | | F16H 61/0251 |

* cited by examiner

CONTROLLER AND CONTROL METHOD FOR LINEAR SOLENOID VALVE

BACKGROUND

1. Field

The present disclosure relates to a controller and a control method for a linear solenoid valve.

2. Description of Related Art

Japanese Laid-Open Patent Publication No. 2014-197655 discloses a typical controller that executes dither control to reduce the static friction between a sleeve and a spool of a linear solenoid valve by cyclically increasing and decreasing an exciting current in the linear solenoid valve, which is supplied with hydraulic oil, and vibrating the spool of the linear solenoid valve.

The viscosity of hydraulic oil differs depending on its temperature. Thus, when the hydraulic oil has a low temperature and a high viscosity, the spool can be vibrated properly by lengthening a dither cycle (a vibration cycle of the spool obtained by the dither control), that is, by lowering a vibration frequency of the spool obtained by the dither control. In contrast, when the hydraulic oil has a high temperature and a low viscosity, the spool can be vibrated properly by shortening the dither cycle, that is, by increasing the vibration frequency of the spool obtained by the dither control.

However, when the temperature of oil is changing and is not stable, optimizing the dither cycle is difficult. Thus, vibrating the spool in a proper manner is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, a first aspect of the present disclosure provides a controller for a linear solenoid valve. The controller is configured to execute a pulse-width-modulation control that controls an exciting current in the linear solenoid valve supplied with hydraulic oil and a dither control that cyclically increases and decreases the exciting current so as to vibrate a spool of the linear solenoid valve. A vibration cycle of the spool obtained through the dither control is referred to a dither cycle. The dither control includes a first dither control that vibrates the spool in a first dither cycle and a second dither control that vibrates the spool in a second dither cycle that is shorter than the first dither cycle. The controller is configured to execute the first dither control and the second dither control when an oil temperature of the hydraulic oil is between a first oil temperature and a second oil temperature that is higher than the first oil temperature.

To solve the above-described problem, a second aspect of the present disclosure provides a controller for a linear solenoid valve. The controller includes circuitry configured to execute a pulse-width-modulation control that controls an exciting current in the linear solenoid valve supplied with hydraulic oil and a dither control that cyclically increases and decreases the exciting current so as to vibrate a spool of the linear solenoid valve. A vibration cycle of the spool obtained through the dither control is referred to a dither cycle. The dither control includes a first dither control that vibrates the spool in a first dither cycle and a second dither control that vibrates the spool in a second dither cycle that is shorter than the first dither cycle. The circuitry is configured to execute the first dither control and the second dither control when an oil temperature of the hydraulic oil is between a first oil temperature and a second oil temperature that is higher than the first oil temperature.

To solve the above-described problem, a third aspect of the present disclosure provides a method for controlling a linear solenoid valve. The method includes executing a pulse-width-modulation control that controls an exciting current in the linear solenoid valve supplied with hydraulic oil and executing a dither control that cyclically increases and decreases the exciting current so as to vibrate a spool of the linear solenoid valve. A vibration cycle of the spool obtained through the dither control is referred to a dither cycle, the dither control includes a first dither control that vibrates the spool in a first dither cycle and a second dither control that vibrates the spool in a second dither cycle that is shorter than the first dither cycle. The method also includes executing the first dither control and the second dither control when an oil temperature of the hydraulic oil is between a first oil temperature and a second oil temperature that is higher than the first oil temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a linear solenoid valve 30 employed in a vehicle automatic transmission 10 according to an embodiment will now be described with reference to FIGS. 1 to 10.

Figure 1:
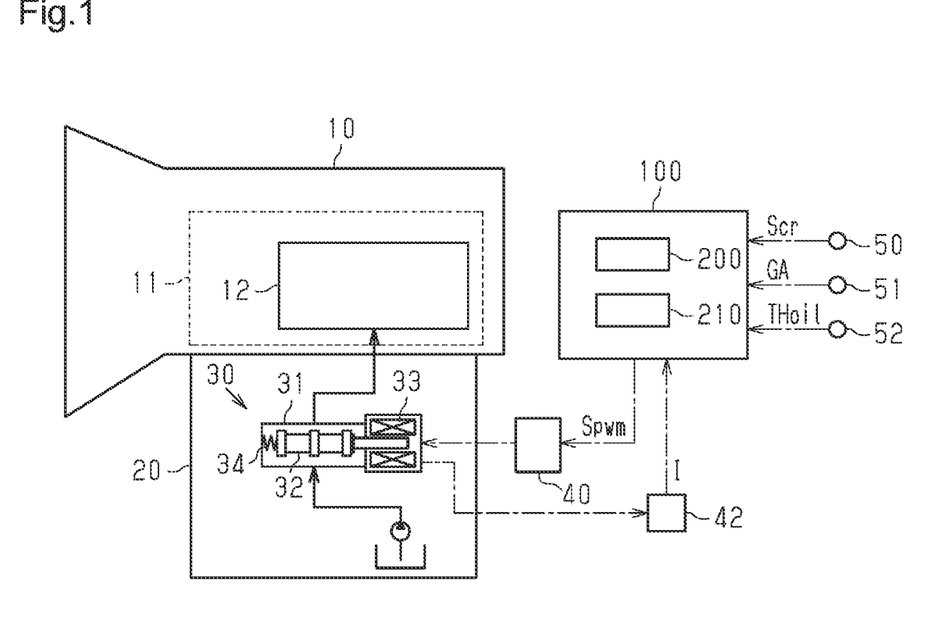
FIG. 1 is a diagram schematically showing a controller for a linear solenoid valve according to an embodiment.

As shown in FIG. 1, the vehicle automatic transmission 10 includes, for example, a transmission mechanism 11 and a hydraulic circuit 20. The transmission mechanism 11 includes an engagement mechanism 12 such as a clutch and a brake. The hydraulic circuit 20 includes the linear solenoid valve 30 that adjusts the pressure of hydraulic oil supplied to the engagement mechanism 12, that is, hydraulic pressure.

The linear solenoid valve 30, which is supplied with the hydraulic oil, includes, for example, a sleeve 31, a spool 32, a spring 34, and an electromagnet 33. The sleeve 31 includes ports. The spool 32 moves in the sleeve 31 in the axial direction so as to switch the state of each port between an open state and a closed state. The spring 34 biases the spool 32 toward one side in the axial direction. The electromagnet 33 moves the spool 32 in the axial direction against the biasing force of the spring 34.

A drive circuit 40 is connected to the electromagnet 33. An exciting current I in the electromagnet 33 changes in response to a signal that is input to the drive circuit 40. As the exciting current/in the electromagnet 33 changes, the position of the spool 32 in the sleeve 31 changes so that the open-closed state of each port changes. This changes the hydraulic pressure supplied from the linear solenoid valve 30 to the engagement mechanism 12. Further, a current detection circuit 42 that detects the exciting current I in the electromagnet 33 is connected to the electromagnet 33.

The controller 100 includes, for example, a central processing unit (hereinafter referred to as the CPU) 200 and a memory 210 that stores programs and data for control. The controller 100 executes various types of control by causing the CPU 200 to execute programs that are stored in the memory 210.

Various sensors are connected to the controller 100. The sensors include, for example, a crank angle sensor 50 that detects a crank angle Scr of a crankshaft of the internal combustion engine installed in the vehicle, an air flow meter 51 that detects an intake air amount GA of the internal combustion engine, an oil temperature sensor 52 that detects an oil temperature THoil, which is the temperature of hydraulic oil supplied to the engagement mechanism 12, and a vehicle speed sensor that detects the speed of the vehicle. Further, the current detection circuit 42 is connected to the controller 100. The controller 100 executes various types of control using signals that are output from the sensors and the detection circuit.

The controller 100 executes, as one of such types of control, a drive control for the linear solenoid valve 30 by inputting a pulse-width-modulation (hereinafter referred to as PWM) signal Spwm, which is a pulse signal generated through PWM control, to the drive circuit 40 and adjusting an exciting current in the linear solenoid valve 30.

To control the exciting current in such a manner, the controller 100 executes a dither control. The dither control varies the exciting current I in the electromagnet 33 so as to slightly vibrate the spool 32, thereby reducing the static friction between the sleeve 31 and the spool 32.

The dither control includes a first dither control and a second dither control. The first dither control cyclically increases and decreases a target current value It of the exciting current I so as to vary the exciting current I. The second dither control cyclically increases and decreases a duty cycle DR of the PWM signal Spwm so as to vary the exciting current I.

The pulse cycle of the PWM signal Spwm, which is generated through the PWM control, is hereinafter referred to as the PWM cycle Tpwm. The vibration cycle of the spool 32 obtained through the first dither control is hereinafter referred to as the first dither cycle Td1. The vibration cycle of the spool 32 obtained through the second dither control is hereinafter referred to as the second dither cycle Td2. In the present embodiment, five consecutive PWM cycles correspond to one second dither cycle Td2. In the present embodiment, the first dither cycle Td1 is longer than the second dither cycle Td2. In other words, the vibration frequency of the spool 32 obtained through the first dither control is lower than the vibration frequency of the spool 32 obtained through the second dither control. Accordingly, the first dither control is executed for a high-viscosity hydraulic oil, and the second dither control is executed for a low-viscosity hydraulic oil.

Figure 2:
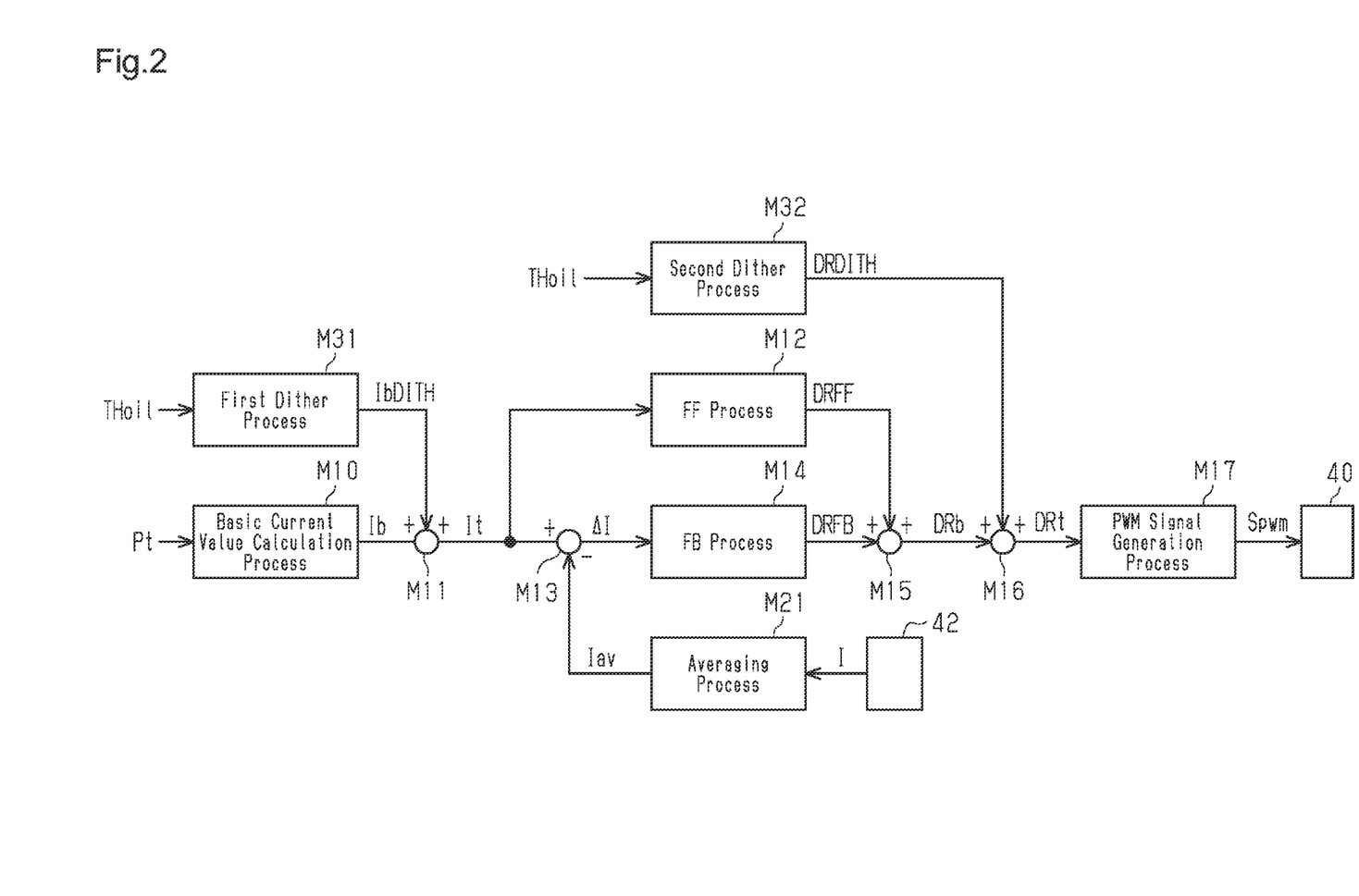
FIG. 2 is a block diagram showing processes executed by the controller.

FIG. 2 shows the processes related to the drive control for the linear solenoid valve 30 executed by the controller 100.

A basic current value calculation process M10 uses a target hydraulic pressure Pt to calculate a basic current value Ib, which is a basic value of the exciting current I in the electromagnet 33. The target hydraulic pressure Pt is a value calculated by the controller 100 from the running state of the vehicle detected by various sensors. Also, the target hydraulic pressure Pt is a target value of the hydraulic pressure supplied from the linear solenoid valve 30 to the engagement mechanism 12.

A first dither process M31 uses the oil temperature THoil to calculate a first dither correction amount IbDITH and the first dither cycle Td1. The first dither correction amount IbDITH is 0 or a positive value. Also, the first dither correction amount IbDITH is a current value used to correct the basic current value Ib in order to execute the first dither control. The manner of calculating the first dither correction amount IbDITH and the first dither cycle Td1 will be described in detail later.

A first addition process M11 calculates the target current value It, which is the target value of the exciting current I. The target current value It is the sum of the basic current value Ib and the first dither correction amount IbDITH. The first addition process M11 and the first dither process M31 are performed to execute the first dither control.

Figure 3:
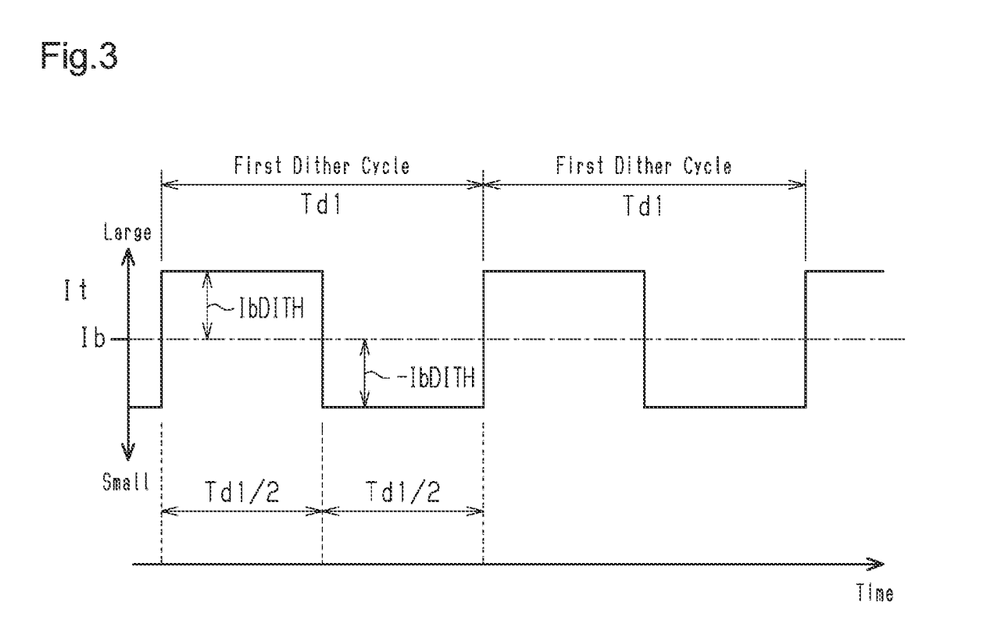
FIG. 3 is a timing diagram showing changes in the target current value in a case where the first dither control is executed.

As shown in FIG. 3, the first dither control repeatedly executes, in each half of the first dither cycle Td1, a process that sets the target current value It to a value obtained by adding the first dither correction amount IbDITH to the basic current value Ib and a process that converts the sign of the first dither correction amount IbDITH into minus and then adds it to the basic current value Ib (that is, a process that sets the target current value It to a value obtained by subtracting the first dither correction amount IbDITH from the basic current value Ib). Thus, in one first dither cycle Td1, the increase in the target current value It caused by the first dither correction amount IbDITH is offset by the decrease in the target current value It caused by the first dither correction amount IbDITH. Accordingly, the average value of the target current value It in one first dither cycle Td1 is equal to the target current value It obtained when the first dither control is not executed.

FIG. 2 shows a feedforward process (FF process) M12 that uses the target current value It to calculate a feedforward value DRFF. The feedforward value DRFF is the duty cycle of the PWM signal Spwm. As the target current value It increases, the calculated value of the feedforward value DRFF increases.

An averaging process M21 calculates an average current value Iav, which is the average value of the exciting current I detected by the current detection circuit 42. The average current value Iav is the average value of the exciting current I in a period of a natural number multiple (one in the present embodiment) of the second dither cycle Td2. Accordingly, an average value calculation cycle Tav, which is the calculation cycle of the average current value Iav, is equal to the second dither cycle Td2.

A subtraction process M13 calculates a difference ΔI between the target current value It and the average current value Iav.

A feedback process (FB process) M14 calculates a feedback value DRFB by executing a feedback control that is based on the difference ΔI. The feedback value DRFB is also the duty cycle of the PWM signal Spwm. The feedback value DRFB is used to correct the duty cycle of the PWM signal Spwm such that the difference ΔI becomes close to zero, that is, such that the target current value It matches the average current value fay. The feedback process M14 calculates the feedback value DRFB through a typical feedback control, such as PI control or PID control. Since the execution of the feedback control needs the average current value Iav, a feedback cycle Tfb, which is the execution cycle of the feedback control, is equal to the average value calculation cycle Tav. Further, even if the target current value It is cyclically changed in a shorter cycle than the feedback cycle Tfb, such a cyclical change of the target current value It is not reflected except the point in time at which the feedback control is executed. Accordingly, the first dither cycle Td1, during which the target current value It cyclically increases and decreases, is longer than the feedback cycle Tfb.

A second addition process M15 calculates a basic duty cycle DRb. The basic duty cycle DRb is the sum of the feedforward value DRFF and the feedback value DRFB. The basic duty cycle DRb is calculated through the feedback control such that the target current value It matches the average current value Iav. The basic duty cycle DRb and an ON time (basic ON time τb; described later) of the PWM signal Spwm, which is determined by the basic duty cycle DRb and a pulse frequency of the PWM signal Spwm, are equivalent to a control value of the PWM signal obtained through the feedback control.

A second dither process M32 uses the oil temperature THoil to calculate a second dither correction amount DRDITH and the second dither cycle Td2. The second dither correction amount DRDITH is a duty cycle used to correct the basic duty cycle DRb in order to execute the second dither control. In one dither cycle, a different second dither correction amount DRDITH is calculated in each PWM cycle Tpwm. The manner of calculating the second dither correction amount DRDITH and the second dither cycle Td2 will be described in detail later.

A third addition process M16 calculates a target duty cycle DRt. The target duty cycle DRt is the sum of the basic duty cycle DRb and the second dither correction amount DRDITH. The third addition process M16 and the second dither process M32 are performed to execute the second dither control.

A PWM signal generation process M17 generates the PWM signal Spwm for which the ON time is set from the target duty cycle DRt and the PWM cycle Tpwm, which is calculated by dividing the second dither cycle Td2 by 5, and outputs the PWM signal Spwm to the drive circuit 40. The drive circuit 40 switches on and off the electromagnet 33 in response to the received PWM signal Spwm so as to adjust the exciting current I in the electromagnet 33 to a value corresponding to the target duty cycle DRt.

Figure 4:
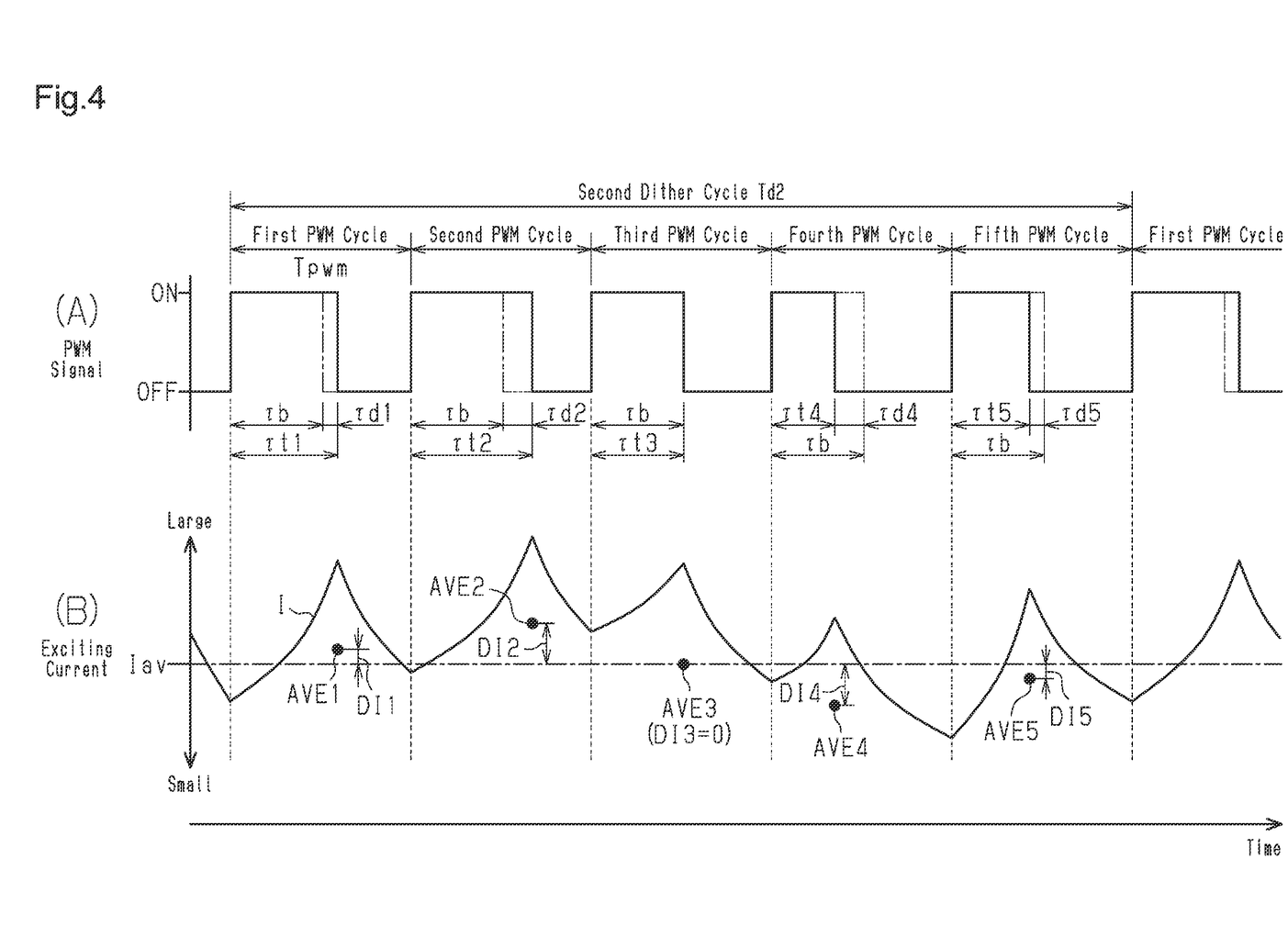
FIG. 4 is a timing diagram in a case where the second dither control is executed, in which section (A) shows changes in the PWM signal and section (B) shows changes in the exciting current.

Sections (A) and (B) of FIG. 4 show how to calculate the second dither correction amount DRDITH through the second dither process M32. In the present embodiment, as described above, five consecutive PWM cycles correspond to one second dither cycle Td2. In the following description, these PWM cycles are chronologically referred to as the first PWM cycle, the second PWM cycle, the third PWM cycle, the fourth PWM cycle, and the fifth PWM cycle.

In the present embodiment, the second dither correction amount DRDITH is calculated as follows. That is, the second dither correction amount DRDITH is calculated such that the increase in the exciting current I caused by the second dither correction amount DRDITH is offset by the decrease in the exciting current I caused by the second dither correction amount DRDITH in one second dither cycle Td2. In addition, as shown in, for example, the following equation (1), the second dither correction amount DRDITH in each PWM cycle is calculated by multiplying a dither current value (a current value equivalent to the second dither correction amount DRDITH) by the ratio of the control value of the PWM signal Spwm obtained from the feedback control to the average current value Jay.

In the present embodiment, the difference between the average value of the exciting current I and the average current value Iav in each PWM cycle Tpwm is a dither current value DI (a current value equivalent to the second dither correction amount DRDITH).

More specifically, the average current value of the exciting current I in the first PWM cycle is referred to as AVE1, the average current value of the exciting current I in the second PWM cycle is referred to as AVE2, the average current value of the exciting current I in the third PWM cycle is referred to as AVE3, the average current value of the exciting current I in the fourth PWM cycle is referred to as AVE4, and the average current value of the exciting current I in the fifth PWM cycle is referred to as AVE5. The total amount of values obtained by subtracting the average current values Iav from AVE1, AVE2, AVE3, AVE4, and AVE5 is 0. In the present embodiment, AVE3 matches the average current value Iav, and the average current value of the exciting current I in each PWM cycle Tpwm satisfies the relationship of AVE2>AVE1>AVE3>AVE5>AVE4. In such a manner, the average current value in each PWM cycle in one second dither cycle increases and decreases so as to undulate like a sine wave with AVE3 serving as a central value of the oscillation.

An ON time it of the PWM signal in each PWM cycle Tpwm is set by correcting, by a correction time τd corresponding to the second dither correction amount DRDITH, the basic ON time τb corresponding to the basic duty cycle DRb calculated as described above. For example, an ON time τt1 of the PWM signal in the first PWM cycle Tpwm is set by correcting, by a first correction time τd1 corresponding to the second dither correction amount DRDITH, the basic ON time τb corresponding to the basic duty cycle DRb calculated as described above.

The basic ON time τb is needed to make the target current value It match the average current value Jay. The correction time τd is used to execute the second dither control by differentiating the average current value in each PWM cycle.

The second dither correction amount DRDITH corresponding to the correction time τd in each PWM cycle is calculated using the following equations (1) and (7).

$$\tau d(n) = \frac{\tau d}{Iav} \cdot DIb \cdot \left(\frac{k}{c}, k, 0, -k, -\frac{k}{c}\right) \quad (1)$$

where n=1 to 5
τb: Basic ON Time
Iav: Average Current Value
DIb: Basic Dither Current Value
k: constant
c: constant The basic dither current value DIb in equation (1) is the basic value of the dither current value DI. The basic dither current value DIb is variably set so as to become larger as the oil temperature THoil decreases. When the basic dither current value DIb is variably set in correspondence with the oil temperature THoil in this manner, the second dither correction amount DRDITH is variably set in correspondence with the oil temperature THoil as described above. The manner of calculating the basic dither current value DIb will be described in detail later.

The basic ON time τb is a control value of the PWM signal Spwm obtained from the feedback control as described above.

The constant k is set through, for example, preliminary examinations. As the constant k increases, the oscillation of the spool 32 caused by the dither control increases. The constant c is also set through, for example, preliminary examinations. In the present embodiment, the constant c is set to, for example, 2.

Based on the above-described equation (1), the first correction time τd1 in the first PWM cycle is calculated from the following equation (2).

$$\tau d1 = \frac{\tau b}{Iav} \cdot DIb \cdot \left(\frac{k}{c}\right) \quad (2)$$

The value of DIb×(k/c) in equation (2) indicates a dither current value DI1 in the first PWM cycle and is equivalent to a value obtained by subtracting the average current value Iav from AVE1 (i.e., a positive value).

Based on the above-described equation (1), a second correction time τd2 in the second PWM cycle is calculated from the following equation (3).

$$\tau d2 = \frac{\tau b}{Iav} \cdot DIb \cdot (k) \quad (3)$$

The value of DIb×(k) in equation (3) indicates a dither current value DI2 in the second PWM cycle and is equivalent to a value obtained by subtracting the average current value Iav from AVE2 (i.e., a positive value).

Based on the above-described equation (1), a third correction time τd3 in the third PWM cycle is calculated from the following equation (4).

The value of DIb×(0) in equation (4) indicates a dither current value DI3 in the third PWM cycle and is equivalent to a value obtained by subtracting the average current value Iav from AVE3.

$$\tau d3 = \frac{\tau b}{Iav} \cdot DIb \cdot (0) \quad (4)$$

Based on the above-described equation (1), a fourth correction time τd4 in the fourth PWM cycle is calculated from the following equation (5).

The value of DIb×(−k) in equation (5) indicates a dither current value DI4 in the fourth PWM cycle and is equivalent to a value obtained by subtracting the average current value Iav from AVE4 (i.e., a negative value).

$$\tau d4 = \frac{\tau b}{Iav} \cdot DIb \cdot (-k) \quad (5)$$

Based on the above-described equation (1), a fifth correction time τd5 in the fifth PWM cycle is calculated from the following equation (6).

The value of DIb×(−k/c) in equation (6) indicates a dither current value DI5 in the fifth PWM cycle and is equivalent to a value obtained by subtracting the average current value Iav from AVE5 (i.e., a negative value).

$$\tau d5 = \frac{\tau b}{Iav} \cdot DIb \cdot \left(-\frac{k}{c}\right) \quad (6)$$

The second dither correction amounts DRDITH in the PWM cycles are calculated by substituting, into the following equation (7), the correction times τd1 to τd5 calculated in this manner. The pulse frequency H is calculated from the PWM cycle Tpwm (H=1000/Tpwm).

$$DRDITH = \tau d \cdot H/10 \quad (7)$$

DRDIRH: Dither Correction Amount DRDITH (%)
τd: Correction Time (ms)
H: Pulse Frequency of PWM signal (Hz)

In the second dither control executed in this manner, the second dither correction amount DRDITH is calculated such that the increase in the exciting current I caused by the second dither correction amount DRDITH is offset by the decrease in the exciting current I caused by the second dither correction amount DRDITH in one second dither cycle Td2. Thus, the average current value Iav in one second dither cycle Td2 is equal to the average value of the exciting current I obtained when the second dither control is not executed. Accordingly, even if the second dither control is executed, the average current value Jay converges to the target current value It through the feedback control. The feedback control is executed with the influence of the second dither control limited. This improves the controllability of the exciting current I.

When the power supply voltage that drives the linear solenoid valve 30 is changed or when the resistance value of the linear solenoid valve 30 is changed by temperature changes, the magnitude of the exciting current I corresponding to the control value of the PWM signal Spwm becomes different. For example, the control value is the duty cycle of the PWM signal Spwm from which the current average current value Iav is obtained or is the ON time of the PWM signal Spwm that changes depending on that duty cycle. This potentially lowers the robustness of the control for the exciting current I through the second dither control.

In the second dither control, as shown in the above-described equation (1), the second dither correction amount DRDITH in each PWM cycle is calculated by multiplying the dither current value DI equivalent to the dither correction amount (i.e., each value of DIb·(k/c, k, 0, −k, −k/c) in equation (1)) by the ratio of the average current value Iav and the basic ON time τb, which is the control value of the PWM signal Spwm obtained through the feedback control (i.e., the value of τb/Iav in equation (1)).

The ratio of the control value of the PWM signal Spwm and the average current value Iav obtained through the feedback control is a value indicating the control value of the PWM signal Spwm per unit current value in the present power supply voltage or the resistance value of the linear solenoid valve 30. Accordingly, the value obtained by multiplying the dither current value DI by such a ratio indicates the control value of the PWM signal Spwm that is needed to obtain the dither current value DI for the dither control in the present power supply voltage or the resistance value of the PWM signal Spwm, so that the second dither correction amount DRDITH is calculated from the indicated value. This improves the robustness in the second dither control.

The process that calculates the first dither correction amount IbDITH and the first dither cycle Td1 in the first dither control will now be described.

Figure 5:
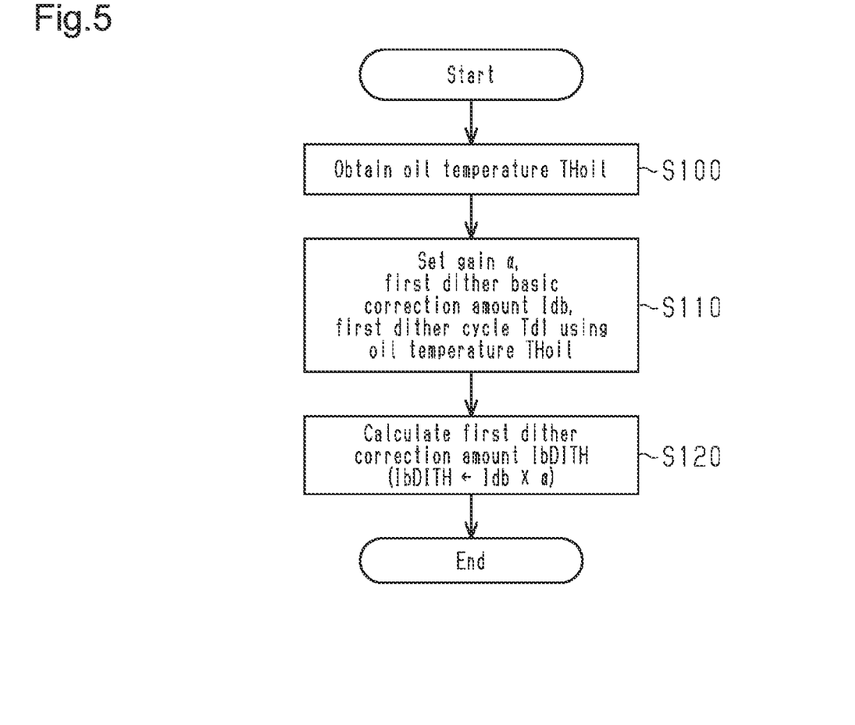
FIG. 5 is a flowchart showing a procedure for processes executed by the controller.

FIG. 5 shows a procedure for the calculation process executed by the controller 100 of the present embodiment. The processes shown in FIG. 5 are executed by the CPU 200 repeatedly executing the programs stored in the memory 210 in synchronization with the first dither cycle Td1. In the following description, the number of each step is represented by the letter S followed by a numeral.

In the series of processes shown in FIG. 5, the CPU 200 first obtains the oil temperature THoil (S100).

Next, the CPU 200 uses the oil temperature THoil to set a gain α, a first dither basic correction amount Idb, and the first dither cycle Td1 (S110).

Figure 6:
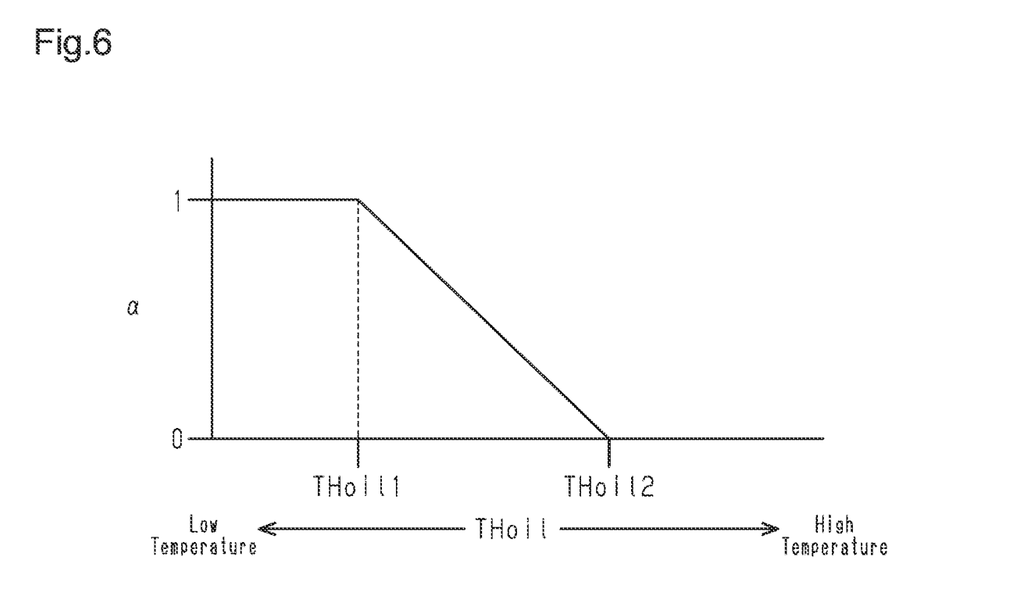
FIG. 6 is a graph showing the relationship between the oil temperature and the gain.

As shown in FIG. 6, the gain α is a value that is variably set between 0 and 1 in correspondence with the oil temperature THoil. More specifically, when the oil temperature THoil is less than or equal to a given first oil temperature THoil1, the gain α is set to 1. When the oil temperature THoil is greater than or equal to a given second oil temperature THoil2 that is higher than the first oil temperature THoil1, the gain α is set to 0. In a range in which the oil temperature THoil is higher than the first oil temperature THoil1 and lower than the second oil temperature THoil2, the value of the gain a is set so as to decrease as the oil temperature THoil increases. The first oil temperature THoil1 is set in advance to the lowest value of the oil temperature at which the effect of the second dither control cannot be obtained. The second oil temperature THoil2 is set in advance to the highest value of the oil temperature at which the effect of the first dither control cannot be obtained.

The first dither basic correction amount Idb is the basic value of the first dither correction amount IbDITH and is variably set in correspondence with the oil temperature THoil.

Figure 7:
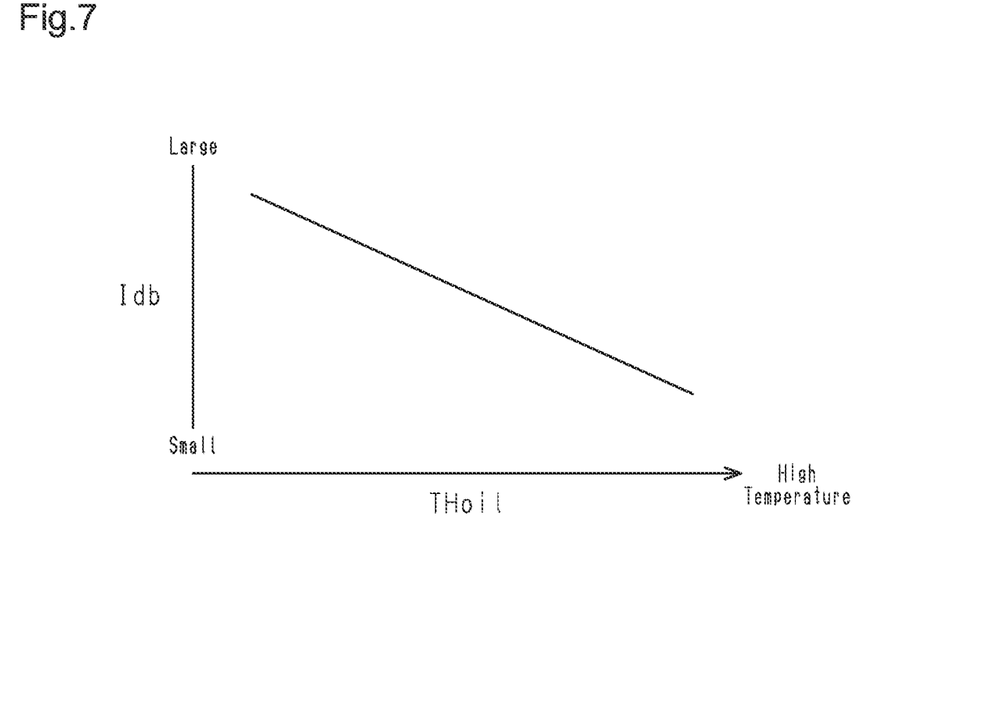
FIG. 7 is a graph showing the relationship between the oil temperature and the first dither basic correction amount.

As shown in FIG. 7, the value of the first dither basic correction amount Idb is variably set so as to increase as the oil temperature THoil decreases. Since the movement of the spool 32 is limited when the oil temperature THoil decreases and the viscosity of hydraulic oil increases, the setting is made in order to limit decreases in the movement speed of the spool 32 that are caused by increases in such a viscosity.

The first dither cycle Td1 is variably set in correspondence with the oil temperature THoil.

Figure 8:
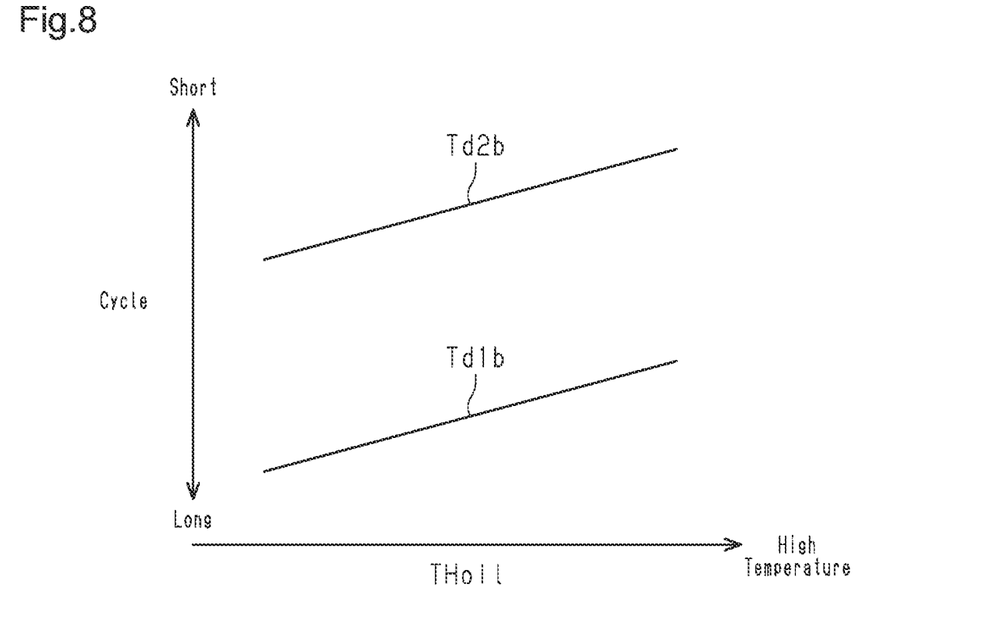
FIG. 8 is a graph showing the relationship between the first dither cycle and the second dither cycle.

As shown in FIG. 8, the value of the first dither cycle Td1 is variably set so as to increase as the oil temperature THoil decreases. This is because the spool 32 can be vibrated in a favorable manner by reducing the vibration frequency of the spool 32 when the oil temperature THoil is low and the viscosity of hydraulic oil is high.

Subsequently, the CPU 200 calculates the first dither correction amount IbDITH (S120). In S120, the CPU 200 calculates the first dither correction amount IbDITH by multiplying the gain α by the first dither basic correction amount Idb.

When ending the process of S120, the CPU 200 temporarily ends the current procedure.

The process that calculates the basic dither current value DIb and the second dither cycle Td2 in the second dither control will now be described.

Figure 9:
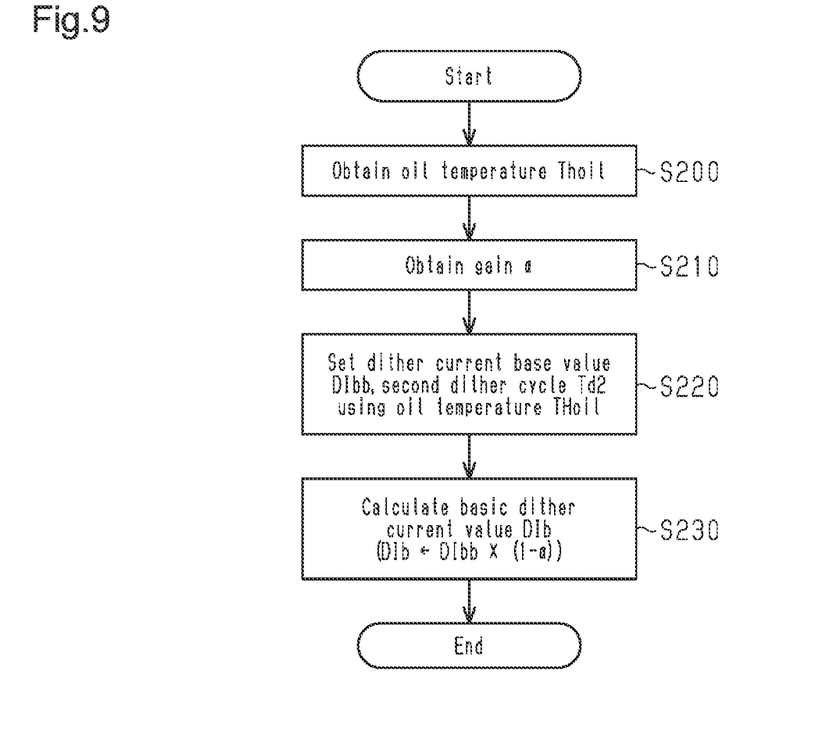
FIG. 9 is a flowchart showing a procedure for processes executed by the controller.

FIG. 9 shows a procedure for the calculation process executed by the controller 100 of the present embodiment. The processes shown in FIG. 9 are executed by the CPU 200 repeatedly executing the programs stored in the memory 210 in synchronization with the PWM cycle Tpwm.

In the series of processes shown in FIG. 9, the CPU 200 first obtains the oil temperature THoil (S200).

Next, the CPU 200 obtains the newest gain α that was set in the process of S110 (S210).

Then, the CPU 200 uses the oil temperature THoil to set the dither current base value DIbb and the second dither cycle Td2 (S220).

The dither current base value DIbb is the basic value of the basic dither current value DIb and is variably set in correspondence with the oil temperature THoil.

Figure 10:
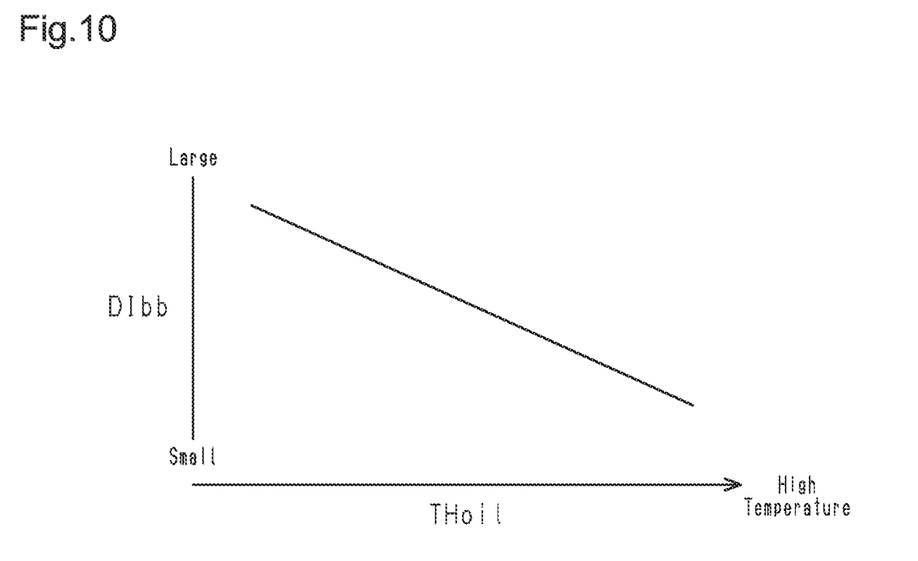
FIG. 10 is a graph showing the relationship between the oil temperature and the dither current base value DIbb.

As shown in FIG. 10, the value of the dither current base value DIbb is variably set so as to increase as the oil temperature THoil decreases. Since the movement of the spool 32 is limited when the oil temperature THoil decreases and the viscosity of hydraulic oil increases, the setting is made in order to limit decreases in the movement speed of the spool 32 that are caused by increases in such a viscosity.

The second dither cycle Td2 is variably set in correspondence with the oil temperature THoil.

As shown in FIG. 8, the value of the second dither cycle Td2 is variably set so as to increase as the oil temperature THoil decreases. This is because the spool 32 can be vibrated in a favorable manner by reducing the vibration frequency of the spool 32 when the oil temperature THoil is low and the viscosity of hydraulic oil is high. Even at the same oil temperature THoil, the second dither cycle Td2 is set in advance so as to become shorter than the first dither cycle Td1. Thus, the vibration frequency of the spool 32 obtained through the first dither control is lower than the vibration frequency of the spool 32 obtained through the second dither control. The PWM cycle Tpwm is set to the value obtained by dividing, by 5, the second dither cycle Td2 set in such a manner.

Subsequently, the CPU 200 calculates the basic dither current value DIb (S230). In S230, the CPU 200 calculates the basic dither current value DIb by multiplying 1− gain α by the dither current base value DIbb.

When ending the process of S230, the CPU 200 temporarily ends the current procedure.

The operation and advantages of the present embodiment will now be described.

(1) As shown in FIG. 6, when the oil temperature THoil is between the first oil temperature THoil1 and the second oil temperature THoil2, the gain α is set to a value in a range larger than 0 and smaller than 1. When the gain α is set to a value other than 0 and 1 in this manner, the value of the first dither correction amount IbDITH becomes larger than 0 in the process of S120 in FIG. 5. Thus, the first dither control is executed. In the same manner, the value of the basic dither current value DIb becomes larger than 0 in the process of S230 in FIG. 9. Thus, the second dither control is executed.

In such a manner, when the oil temperature THoil is between the first oil temperature THoil1 and the second oil temperature THoil2, the first dither control and the second dither control are executed. When the first dither control and the second dither control are executed in such a manner, a low-frequency component corresponding to a high-viscosity hydraulic oil and a high-frequency component corresponding to a low-viscosity hydraulic oil are superimposed on each other in the vibration components of the spool 32. Accordingly, even if the temperature of oil is changing and is not stable, the spool 32 can be vibrated properly.

(2) As shown in FIG. 6, when the oil temperature THoil is less than or equal to the first oil temperature THoil1, the gain α is set to 1. When the gain α is set to 1 in this manner, the value of the first dither correction amount IbDITH becomes larger than 0 in the process of S120 in FIG. 5. Thus, the first dither control is executed. In contrast, the value of the basic dither current value DIb becomes 0 in the process of S230 in FIG. 9. Thus, the second dither control is stopped.

In such a manner, when the oil temperature THoil is low and is less than or equal to the first oil temperature THoil1, the second dither control corresponding to a low viscosity is stopped while the first dither control corresponding to a high viscosity is executed. This allows the dither control to be efficiently executed in correspondence with a low oil temperature.

(3) As shown in FIG. 6, when the oil temperature THoil is greater than or equal to the second oil temperature THoil2, the gain α is set to 0. When the gain α is set to 0 in this manner, the value of the first dither correction amount IbDITH becomes 0 in the process of S120 in FIG. 5. Thus, the first dither control is stopped. In contrast, the value of the basic dither current value DIb becomes larger than 0 in the process of S230 in FIG. 9. Thus, the second dither control is executed.

In such a manner, when the oil temperature THoil is high and is greater than or equal to the second oil temperature THoil2, the first dither control corresponding to a high viscosity is stopped while the second dither control corresponding to a low viscosity is executed. This allows the dither control to be efficiently executed in correspondence with a high oil temperature.

(4) When the first dither control and the second dither control are executed, that is, when the oil temperature THoil is in a range higher than the first oil temperature THoil1 and lower than the second oil temperature THoil2 as shown in FIG. 6, the value of the gain α is set so as to decrease as the oil temperature THoil increases. As the value of the gain α decreases, the value of the first dither correction amount IbDITH calculated in the process of S120 in FIG. 5 decreases and thus the oscillation of the first dither cycle decreases. In contrast, as the value of the gain α decreases, the basic dither current value DIb calculated in the process of S230 in FIG. 9 increases and thus the oscillation of the second dither cycle increases. Thus, as the oil temperature THoil increases and the viscosity of hydraulic oil decreases, the vibration component obtained through the first dither control corresponding to a high viscosity decreases while the vibration component obtained through the second dither control corresponding to a low viscosity increases. This allows the spool 32 to be vibrated properly in correspondence with changes in the viscosity of hydraulic oil.

(5) The second dither cycle Td2 is shorter than the first dither cycle Td1. If the second dither cycle Td2 is longer than the first dither cycle Td1, the average value calculation cycle Tav is longer as compared with when the second dither cycle Td2 is shorter than the first dither cycle Td1. As the average value calculation cycle Tav becomes longer, the feedback cycle Tfb also becomes longer. This potentially worsens the responsivity or the like of the feedback control. In the present embodiment, since the second dither cycle Td2 is shorter than the first dither cycle Td1, such worsening of the responsivity of the feedback control is limited.

If the second dither cycle Td2 is longer than the first dither cycle Td1, that is, if the first dither cycle Td1 is shorter than the second dither cycle Td2, the feedback cycle Tfb used to execute feedback control for the control value of the PWM signal such that the target current value It matches the average current value Iay needs to be shortened as compared with when the first dither cycle Td1 is longer than the second dither cycle Td2. However, shortening the feedback cycle Tfb increases the processing load related to the feedback control. In the present embodiment, since the first dither cycle Td1 is longer than the second dither cycle Td2, such increases in the processing load are limited.

(6) The oil temperature THoil is used to variably set the values of the first dither basic correction amount Idb, which affects the magnitude of the oscillation in the first dither control, the dither current base value DIbb, which affects the magnitude of the oscillation in the second dither control, the first dither cycle Td1, and the second dither cycle Td2. This allows these values to be set properly in correspondence with the viscosity of hydraulic oil when the spool 32 is vibrated.

The present embodiment may be modified as follows. The present embodiment and the following modifications can be combined as long as they remain technically consistent with each other.

In the above-described embodiment, as shown in FIG. 4, the difference between the average value of the exciting current I and the average current value Iav in each PWM cycle is treated as the dither current value DI used to calculate the second dither correction amount DRDITH. Instead, as shown in FIG. 11, the difference between a peak current value PK, which is a peak value of the exciting current I, and the average current value Iav in each PWM cycle may be treated as the dither current value DI used to calculate the second dither correction amount DRDITH.

Figure 11:
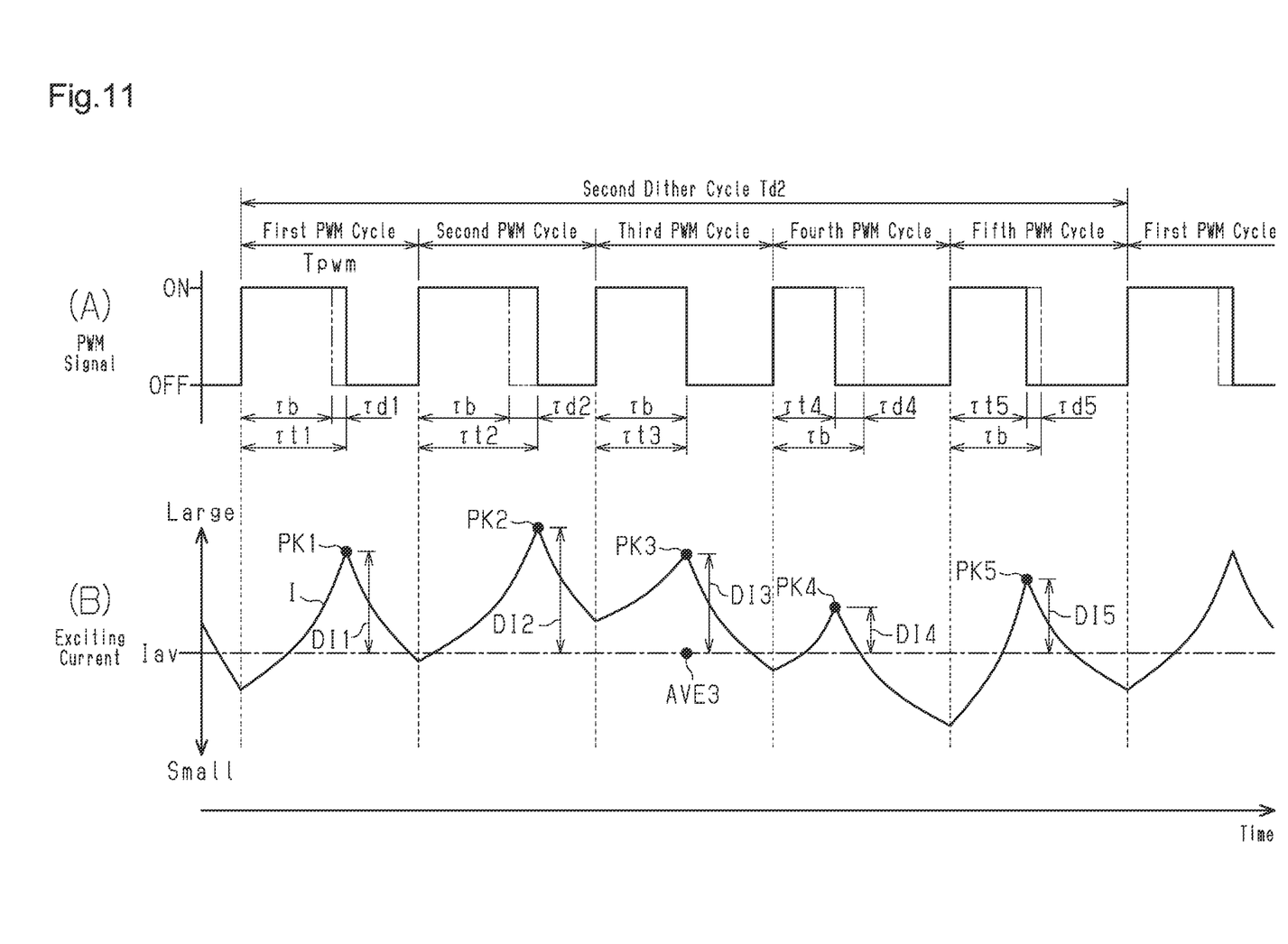
FIG. 11 is a timing diagram in a case where the second dither control is executed in a modification, in which section (A) shows changes in the PWM signal and section (B) shows changes in the exciting current.

As shown in sections (A) and (B) of FIG. 11, in this modification, for example, the peak current value of the exciting current I in the first PWM cycle is referred to as PK1, and the value obtained by subtracting the average current value Iav from PK1 is referred to as the first dither current value DI1. The peak current value of the exciting current I in the second PWM cycle is referred to as PK2, and the value obtained by subtracting the average current value Iav from PK2 is referred to as the second dither current value DI2. The peak current value of the exciting current I in the third PWM cycle is referred to as PK3, and the value obtained by subtracting the average current value Iav from PK3 is referred to as the third dither current value DI3. The peak current value of the exciting current I in the fourth PWM cycle is referred to as PK4, and the value obtained by subtracting the average current value Iav from PK4 is referred to as the fourth dither current value DI4. The peak current value of the exciting current I in the fifth PWM cycle is referred to as PK5, and the value obtained by subtracting the average current value Iav from PK5 is referred to as the fifth dither current value DI5.

The third dither current value DI3 is set such that the average value AVE3 of the exciting current I in the third PWM cycle matches the average current value Jay. Further, setting is made such that the average value of each of the first dither current value DI1, the second dither current value DI2, the fourth dither current value DI4, and the fifth dither current value DI5 matches the third dither current value DI3 and the peak current value PK in each PWM cycle satisfies the relationship of PK2>PK1>PK3>PK5> and PK4. Based on this setting, the second dither correction amount DRDITH is calculated such that each peak current value PK increases and decreases so as to undulate like a sine wave in one second dither cycle and the increase in the exciting current I caused by the second dither correction amount DRDITH is offset by the decrease in the exciting current I caused by the second dither correction amount DRDITH in one second dither cycle.

The second dither correction amount DRDITH in this modification can be calculated using the following equation (8) and the above-described equation (7).

$$\tau d(n) = \left\{ \left(2 \cdot \frac{\tau d}{Iav} \cdot DIb\right) \cdot e^{\frac{R}{L}\tau b - 1} - 1 \right\} \cdot \frac{L}{R} \cdot \left(\frac{k}{c}, k, 0, -k, -\frac{k}{c}\right) \quad (8)$$

where n=1 to 5
τb: Basic ON Time
Iav: Average Current Value
DIb: Basic Dither Current Value
e: Napier's constant
R: Resistance Value of Coil of Electromagnet 33
L: Inductance of Coil of Electromagnet 33
k: constant
c: constant The basic dither current value DIb in equation (8) is the basic value of the dither current value DI in this modification. Also, it is preferred that the basic dither current value DIb be variably set so as to increase as the oil temperature THoil decreases. In the same manner as the series of processes shown in FIG. 9, the basic dither current value DIb may be changed in correspondence with the gain α. The basic ON time τb, the average current value Iav, the constant k, and the constant c are the same as those described in the above-described embodiment.

The second dither correction amount DRDITH in each PWM cycle is calculated by substituting, into the above-described equation (7), the corresponding one of the correction times τd1 to τd5 that are calculated from equation (8).

Such a modification controls the peak value of the exciting current I in each PWM cycle, thereby preventing excessive current from flowing through the linear solenoid valve 30 during the execution of the second dither control.

The basic ON time τb in the above-described equations (1) and (8) may be replaced with the basic duty cycle DRb. In this case, the value calculated from equations (1) and (8) is not the ON time of the PWM signal Spwm but the duty cycle of the PWM signal Spwm. This eliminates the need for a conversion process that is based on the above-described equation (7) used to convert the ON time of the PWM signal Spwm into the duty cycle.

The values of the first dither basic correction amount Idb, the dither current base value DIbb, the first dither cycle Td1, and the second dither cycle Td2 are variably set using the oil temperature THoil. Instead, at least one of these values may be set to a fixed value.

When the first dither control and the second dither control are executed, the oscillations of the first dither cycle and the second dither cycle are variably set such that the oscillation of the first dither cycle decreases while the oscillation of the second dither cycle increases. Instead, when the first dither control and the second dither control are executed, the oscillation of the first dither cycle may be variably set so as to decrease as the oil temperature increases while the oscillation of the second dither cycle may be fixed. Alternatively, when the first dither control and the second dither control are executed, the oscillation of the second dither cycle may be variably set so as to increase as the oil temperature increases while the oscillation of the first dither cycle may be fixed.

The value of a natural number multiple of the second dither cycle Td2 used to calculate the average current value Iav is 1. The value of such a natural number multiple may be changed.

The value of a natural number multiple of the second dither cycle Td2 for calculation of the average current value used for the feedback process M14 is equal to the value of a natural number multiple of the second dither cycle Td2 for calculation of the average current value used for the second dither process M32. Instead, these values may be different from each other.

The number of PWM cycles corresponding to one second dither cycle Td2 is five. The number of PWM cycles may be changed.

The above-described manner of varying the target current value It using the first dither control is merely an example. The target current value It may be varied in another manner.

The above-described manner of varying the duty cycle of a PWM signal using the second dither control is merely an example. The duty cycle may be varied in another manner.

The first dither control varies the target current value It, and the second dither control varies the duty cycle of a PWM signal. Instead, the first dither control and the second dither control may be executed in another manner.

When the oil temperature THoil becomes less than or equal to the first oil temperature THoil1, the second dither control is stopped. Instead, when the oil temperature THoil becomes less than or equal to the first oil temperature THoil1, the second dither control may be executed. That is, to execute the dither control, the second dither control may be constantly executed regardless of oil temperature while the first dither control may be executed when the oil temperature THoil is less than the second oil temperature THoil2. This modification is provided by omitting the process of S230 shown in FIG. 9 and setting the basic dither current value DIb from the oil temperature THoil instead of setting the dither current base value DIbb from the oil temperature THoil in the process of S220.

The first oil temperature THoil1 and the second oil temperature THoil2 may be corrected depending on the type of hydraulic oil. For example, when hydraulic oil having a high viscosity at a given temperature is used, the first oil temperature THoil1 and the second oil temperature THoil2 may be corrected to as to become higher as compared with when hydraulic oil having a low viscosity at the given temperature is used.

The linear solenoid valve 30 is arranged in the hydraulic circuit 20, which supplies hydraulic pressure to the engagement mechanism 12 of the automatic transmission 10. Instead, the linear solenoid valve 30 may be arranged in a hydraulic pressure circuit that supplies hydraulic pressure to another mechanism.

The controller 100 is not limited to a device that includes the CPU 200 and the memory 210 and executes software processing. For example, a dedicated hardware circuit (such as an ASIC) may be provided that executes at least part of the software processes executed in the above-described embodiment. That is, the controller 100 may be modified as long as it has any one of the following configurations (a) to (c): (a) a configuration including a processor that executes all of the above-described processes according to programs and a program storage device such as a memory that stores the programs. (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software processing circuits each including a processor and a program storage device and a plurality of dedicated hardware circuits may be provided. That is, the above-described processes may be executed in any manner as long as the processes are executed by processing circuitry that includes at least one of one or more software processing circuits and one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a linear solenoid valve, wherein
the controller is configured to execute:
   a pulse-width-modulation control that controls an exciting current in the linear solenoid valve supplied with hydraulic oil; and
   a dither control that cyclically increases and decreases the exciting current so as to vibrate a spool of the linear solenoid valve,
a vibration cycle of the spool obtained through the dither control,
the dither control includes a first dither control that vibrates the spool in a first dither cycle and a second dither control that vibrates the spool in a second dither cycle that is shorter than the first dither cycle, pulse cycles of a pulse-width-modulation signal generated through the pulse-width-modulation control being pulse-width-modulation cycles, consecutive ones of the pulse-width-modulation cycles corresponding to the second dither cycle, and
the controller is configured to execute the first dither control and the second dither control when an oil temperature of the hydraulic oil is between a first oil temperature and a second oil temperature that is higher than the first oil temperature.

2. The controller according to claim 1, wherein the controller is configured to stop the first dither control and execute the second dither control when the oil temperature is greater than or equal to the second oil temperature.

3. The controller according to claim 1, wherein the controller is configured to stop the second dither control and execute the first dither control when the oil temperature is less than or equal to the first oil temperature.

4. The controller according to claim 1, wherein when executing the first dither control and the second dither control, the controller is configured to variably set oscillations of the first dither cycle and the second dither cycle such that the oscillation of the first dither cycle decreases while the oscillation of the second dither cycle increases as the oil temperature increases.

5. The controller according to claim 1, wherein
the controller is configured to execute:
   an averaging process that calculates, as an average current value, an average value of the exciting current in a period of a natural number multiple of the second dither cycle;
   a target current value calculation process that calculates a target current value, the target current value being a target value of the exciting current; and
   a feedback process that executes feedback control for a control value of the pulse-width-modulation signal such that the target current value matches the average current value,
a calculation cycle of the average current value is an average value calculation cycle,
an execution cycle of the feedback control is a feedback cycle,
the average value calculation cycle is equal to the feedback cycle,
the first dither control varies the target current value, and
the second dither control varies a duty cycle of the pulse-width-modulation signal.

6. A controller for a linear solenoid valve, the controller comprising circuitry configured to execute:
   a pulse-width-modulation control that controls an exciting current in the linear solenoid valve supplied with hydraulic oil; and
   a dither control that cyclically increases and decreases the exciting current so as to vibrate a spool of the linear solenoid valve, wherein
a vibration cycle of the spool obtained through the dither control,
the dither control includes a first dither control that vibrates the spool in a first dither cycle and a second dither control that vibrates the spool in a second dither cycle that is shorter than the first dither cycle, pulse cycles of a pulse-width-modulation signal generated through the pulse-width-modulation control being pulse-width-modulation cycles, consecutive ones of the pulse-width-modulation cycles corresponding to the second dither cycle, and the circuitry is configured to execute the first dither control and the second dither control when an oil temperature of the hydraulic oil is between a first oil temperature and a second oil temperature that is higher than the first oil temperature.

7. A method for controlling a linear solenoid valve, the method comprising:

executing a pulse-width-modulation control that controls an exciting current in the linear solenoid valve supplied with hydraulic oil;

executing a dither control that cyclically increases and decreases the exciting current so as to vibrate a spool of the linear solenoid valve, wherein a vibration cycle of the spool obtained through the dither control, the dither control includes a first dither control that vibrates the spool in a first dither cycle and a second dither control that vibrates the spool in a second dither cycle that is shorter than the first dither cycle, pulse cycles of a pulse-width-modulation signal generated through the pulse-width-modulation control being pulse-width-modulation cycles, consecutive ones of the pulse-width-modulation cycles corresponding to the second dither cycle; and executing the first dither control and the second dither control when an oil temperature of the hydraulic oil is between a first oil temperature and a second oil temperature that is higher than the first oil temperature.

* * * * *